J. Pepper.
Knitting Mach.

N 7945.

Sheet 1-4 Sheets.

Patented Feb. 25, 1851.

Witnesses,

Inventor.

J. Pepper.
Knitting Mach.
N°7945.
Sheet 2-4 Sheets.
Patented Feb. 25, 1851.
Fig. 2.
Fig. 8.
Fig. 3.
Fig. 6.
Fig. 7.
Fig. 9.
Fig. 5.
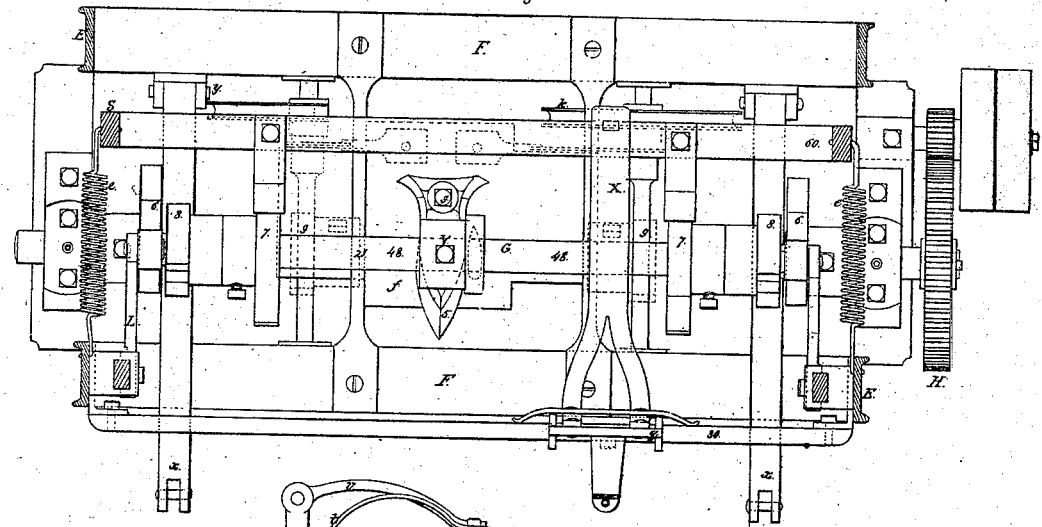
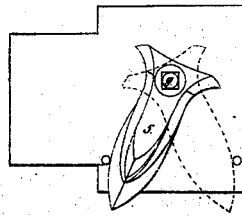
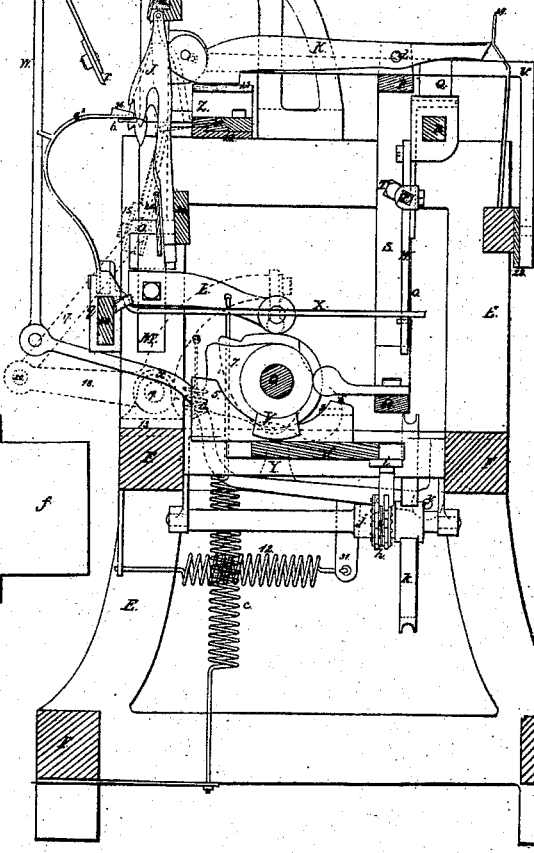
Witnesses.
Albert T. Hatch
James W. Emery
Inventor.
John Pepper J. Pepper.
Knitting Mach.

N° 7,945.

Patented Feb. 25, 1851.

Witnesses.

Inventor.

J. Pepper.
Knitting Mach.
N°. 7,945.
Sheet 4 – 4 Sheets.
Patented Feb. 25, 1851.
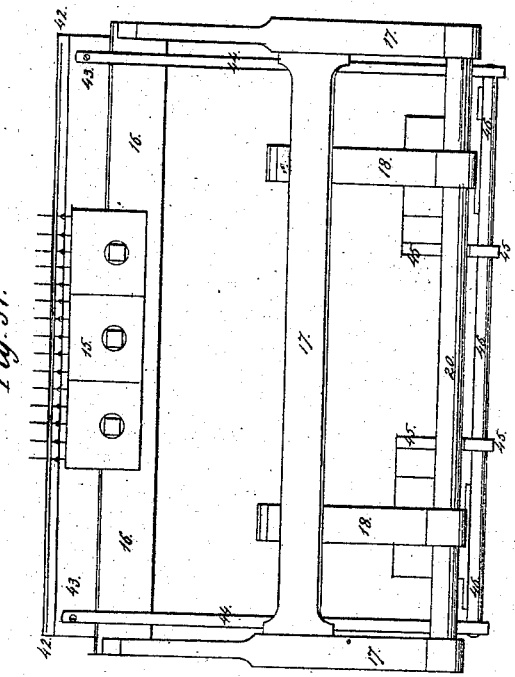
Fig. 37.
Fig. 39.
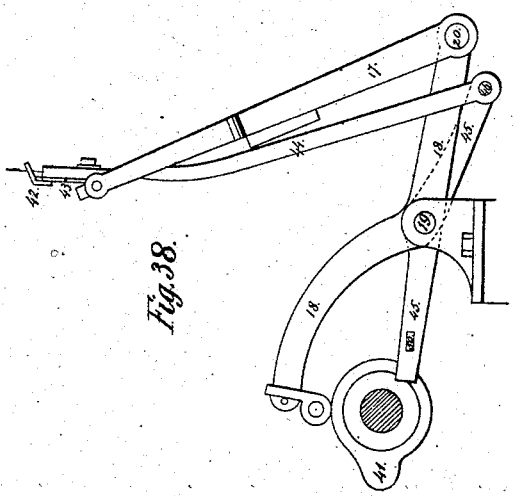
Fig. 38.
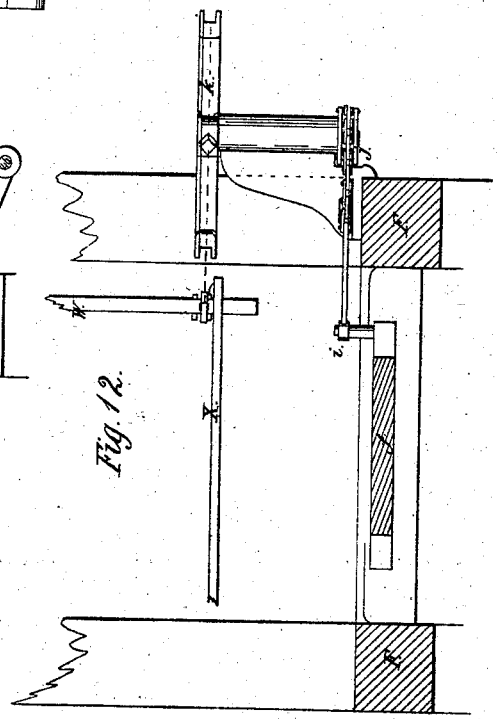
Fig. 12.
Witnesses,
Inventor.
John Pepper

UNITED STATES PATENT OFFICE.

JNO. PEPPER, OF BOSTON, MASSACHUSETTS, ASSIGNOR TO C. WARREN AND H. G. SANFORD.

KNITTING-MACHINE.

Specification of Letters Patent No. 7,945, dated February 25, 1851; Antedated August 25, 1850.

*To all whom it may concern:*

Be it known that I, JOHN PEPPER, of Portsmouth, in the county of Rockingham and State of New Hampshire, have invented new and useful Improvements in the Machinery for Framework-Knitting, being improvements upon the stocking-frame in common use, and so that the same may be worked by steam, water, or other power, and more advantageously than in the manner and by the means heretofore used. The improved frame or machine is to be operated by a power applied to a revolving shaft; and I do hereby declare that the following is a full, clear, and exact description of the construction and operation of the same, reference being had to the annexed drawings, making part of this specification for the better understanding thereof in which—

Figure 1:
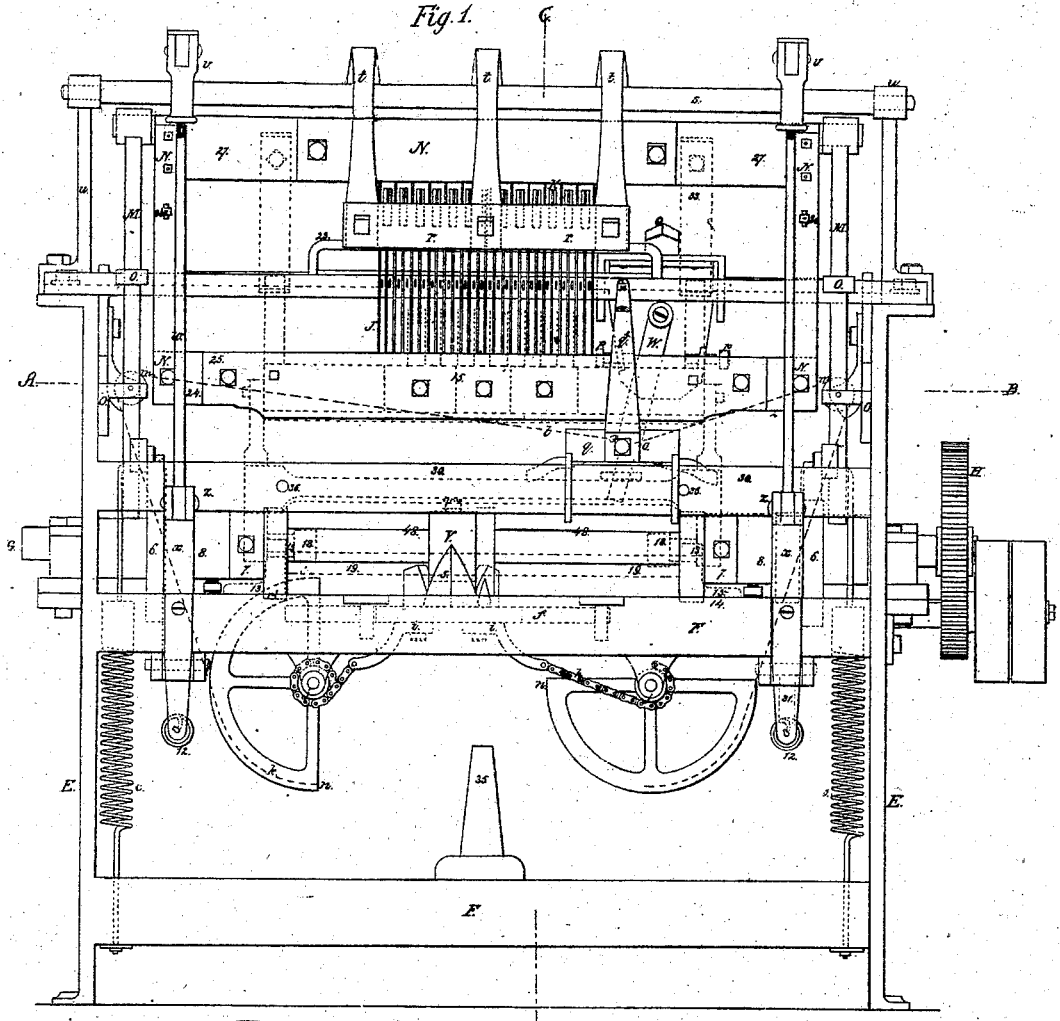
Figure 13:
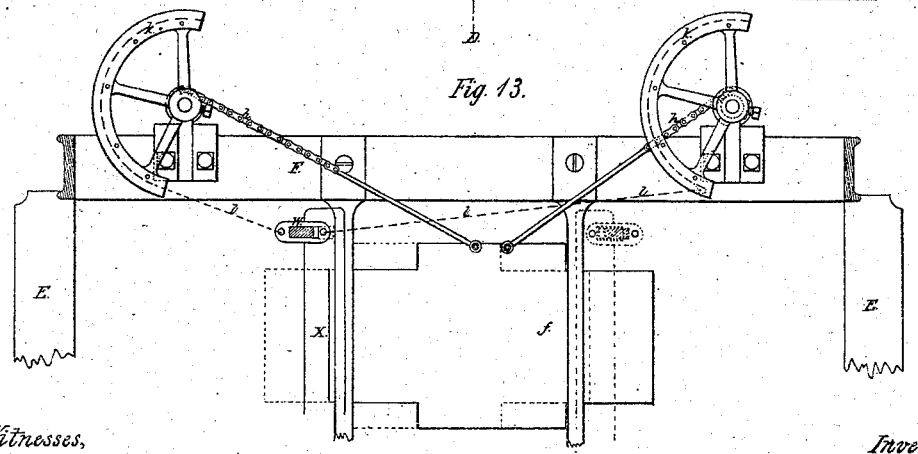
Figure 4:
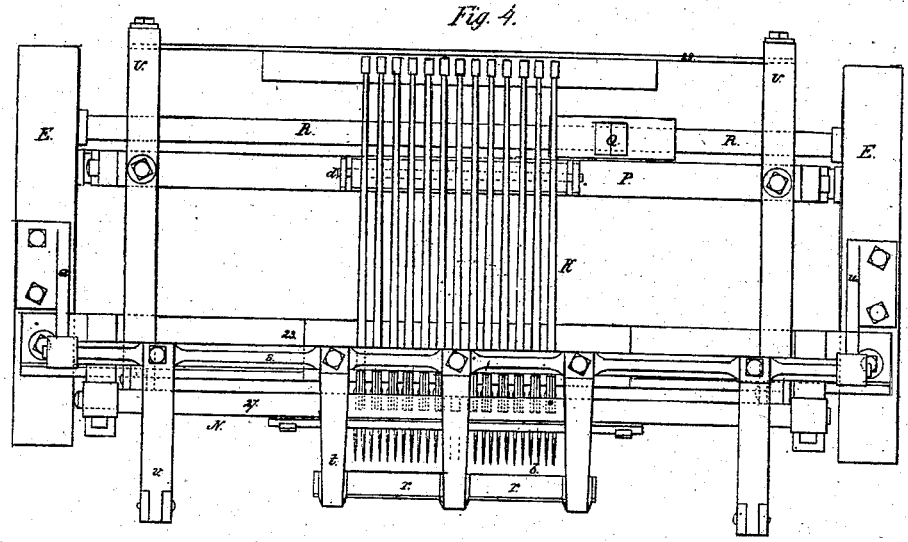
Figure 10:
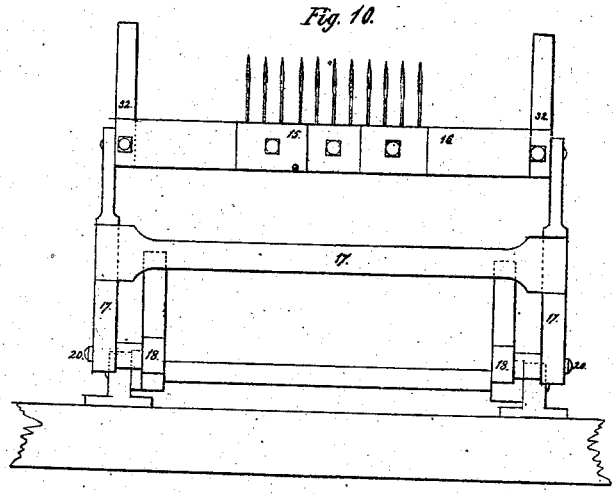
Figure 11:
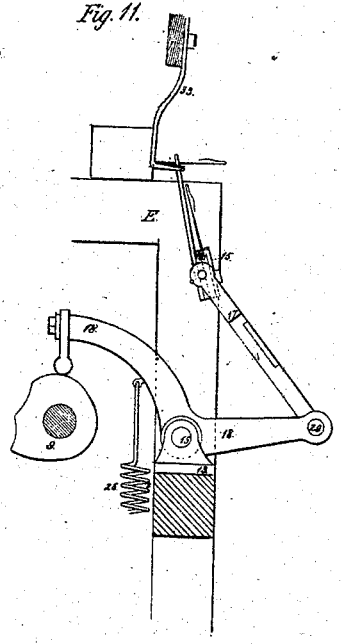

Figure 1 is a front elevation of the whole machine, the parts represented by dotted lines being obscured by other parts of the machine immediately in front. Fig. 2,—is a horizontal section of the same at A, B, of Fig. 1, as seen from above. Fig. 3,—is a vertical section of the same from front to back at C, D, of Fig. 1, as seen from the right. Fig. 4,—is a top view of the same. Fig. 5,—is a top view of the shoe and shoe plate, the full lines showing the position of the shoe when the cam will strike it on the right and the dotted lines its position when the cam will strike it on the left. Fig. 6,—is the form of the two cams, which cause and regulate the upward motion of the sinker frame, and regulate its downward motion. Fig. 7,—is the form of the two cams which cause and regulate the forward motion of the sinkers, and regulate their backward motion. Fig. 8,—is the form of the two cams which cause and regulate the downward motion of the presser, and regulate its upward motion. Fig. 9,—is the form of the two cams which contribute to move and regulate the motion of the whole ribbed work attachment. Fig. 10,—is a front elevation of the ribbed-work attachment. Fig. 11,—is an end view of the same. Fig. 12,—is a vertical section from front to back at C, D, Fig. 1, as seen from the right showing the position of the semi-circles when placed horizontally above the upper rear girth F. Fig. 13,—is a horizontal section at A, B, Fig. 1, showing the semicircles and chains when placed horizontally as seen from above.

The annexed drawings are made on a scale of about three inches to the foot, or one quarter the size of the original machine represented thereby, except the needles which are represented at about their full size, the jacks at about half size, and the shoe at about one-third the size of those in the original machine, the length of the machines may be varied at pleasure according to the number and width of the webs to be knit thereon, without altering the construction of the machine in other respects, except that there must be a carrier and slur knob to each web. The width may be varied at discretion.

The same letters and figures of reference are used in all the said drawings to denote the same parts of the machine.

The letters E designate a frame of cast iron, braced by girths of wood F.

G is the principal shaft to which the power is applied at H.

J represents jack and lead sinkers placed alternately, the jack sinkers attached to the jacks K with a joint, and the lead sinkers attached to the fixed lead A, as in the common stocking frame now in use. Needles *b* fixed in the lead 40 project between each jack and lead sinker, the form and size of the jacks, sinkers and needles are similar to those now in use in the common stocking frame and the movements of the jacks and sinkers to produce the stitch are the same in my machine as in the common stocking frame.

Every cam movement hereinafter described, except that of the cam which acts upon the shoe, is produced by two similar cams, one toward either end of the shaft. The jacks to which the jack sinkers are attached are capable of vibrating on the jack wire or axle *d* passing through the combs on the comb bar P. The tail ends of the jacks are raised and the jack sinkers consequently depressed by the slur knob Q which is made to slide on the slur bar R. The manner of moving the knob Q, will be described hereafter. The upward motion of the jack and lead sinkers which are simultaneous, is caused by the action of the cam 6 against rollers attached laterally to the rear ends of the cam bars L which cam bars are at their front ends firmly attached to the lower end of the slides M of the sinker frame N. The slides M are capable of sliding in the boxes O, and are attached at their upper ends by pivot joints to the sinker bar 27 of the sinker frame, from which bar, the lead sinkers are suspended, and vibrate with the sinker frame. The comb bar P which rests on its axis on the top of the hanging bars S, is connected to the sinker frame N, by the half jacks U, which are firmly fixed to the comb bar P, and which at their forward ends turn upon pivots in boxes attached to the hanging cheeks or uprights of the sinker frame, and being bent down at right angles, are at their other ends fixed to the cross bar 28. Said boxes are attached to said cheeks below the sinker bar 27, and about one third the distance from the top to the bottom of said cheeks, by means of screws in slots, so that their position may be changed up or down as may be required as seen at Fig. 8.

The cross bar 28, contains the springs 29, which press against the tail ends of the jacks. When the sinker frame is raised by the action of the cam 6, the lead sinkers suspended as aforesaid are raised with it, and the forward ends of the half jacks connected with the sinker frame as aforesaid, are also raised, and their rear ends, with the cross bar 28, and the springs 29, are thereby depressed, pressing down the tail ends of the jacks, and thus raising the forward ends with the jack sinkers suspended therefrom, at the same time with the raising of the lead sinkers. The spiral springs C, attached to the cam bars L and to projections from the lower girth F draw the sinker frame N downward as the cam 6 allows causing the downward motions of the lead sinkers suspended to the sinker bar 27, as aforesaid. The sinker bar 27, in its descent presses upon the forward end of the jacks causing the downward motions of the jack sinkers except that caused by the slur knob. The jack and lead sinkers are raised twice, the lead sinkers depressed twice, and the jack sinkers once by every revolution of the cam 6. The first downward motion of the sinker frame bringing down the lead sinkers, after the slur knob has passed and the jack sinkers have fallen raises the springs 29, the jacks remaining unmoved so that the springs are thereby brought into the same relative position to the tail ends of the jacks as they were in before the slur knob passed which relative position is retained till the slur knob acts again. The falling of the lead sinkers upon the thread causes the jack sinkers to rise a little by the tension of the thread so that the loops are equalized. A locker bar is dispensed with. The backward and forward motion of the sinkers is caused by the action of the cam 7, against rollers fixed in projections from the cross bar 60 attached to the lower end of the hanging bars (S,) which hanging bars are capable of swinging on pivots projecting from the studs T attached to the iron frame E. The upper ends of the hanging bars (S.) are connected to the upper parts of the uprights of the sinker frame N, by means of the comb bar P, and the half jacks U in the manner above described, when the lower ends of the hanging bars S, are pushed back by the cams 7, the upper ends are thrown forward causing the sinker frame with all the sinkers to vibrate forward, the spiral springs e attached to the hanging bars S, below their center of motion, and to the front part of the iron frame E, draw the lower parts of the hanging bars forward, throwing the upper ends backward, causing the sinker frame with all the sinkers to vibrate backward, as the cam 7, allows.

The motion of the slur knob Q, and carrier needle $q^2$ right and left alternately, is caused by the action of the cam V, against the shoe 5, which is attached to the shoe plate $f$ by the center pin $g$. At every revolution of the of the cam V, the shoe is pushed to the right or left, moving with it the shoe plate $f$,—if the first revolution pushes it to the right, the second will push it to the left, and so on right and left alternately. One end of each of the chains ($h$) is fastened to the shoe plate at $i$, and the other ends are secured to the hub $j$ of the semi-circles $k$. The chains $l$, fastened at one end to the semicirclees $k$, at $n$, pass around the semicircles and guide pulleys $m$, and are attached at the other end by a hook, or screw bolt to the upright bar W, at $o$. The upper end of the bar W, is connected with the slur knob by a pivot on which it vibrates, right and left to a distance regulated by screws $p$, allowing the slur knob to follow a little behind the carrier needle, so that the jack sinkers will not fall until the thread has passed. The lower end of the bar W, is connected with the carriage $q$ by the horizontal bar X, which may be curved a little so as to make room for the web. The carriage $q$, to which the carrier needle $q^2$ is attached, is capable of sliding on the carrier bar 30, which is firmly fixed to the iron frame E. When the shoe plate is moved to the right or left by the action of the cam V, the chains $h$ attached to the shoe plate $f$ at $i$, and passing around the hubs of the semicircles, cause the semicircles to make about half a revolution, and the chains ($l$) on the periphery of the semicircles move a distance proportional to the increased size of the periphery over the hub. When the shoe plate is pushed to the right, the chain $h$ turns the left semicircle and winds the chain $l$ around its periphery, thereby drawing the slur knob and carrier needle to the left, and at the same time the other chain $l$ inward from the periphery of the right semicircle, and winds the other chain $h$ around its hub. When the shoe plate is pushed to the left, all the motions are reversed, and the slur knob, and carrier needle are thereby drawn to the right.

The distance to which the slur knob and carrier needle must be drawn, varies with the width of the web to be knit, and may be regulated by pins inserted in the cross bar 30, at 36, as well as by the length of the chains, and the size of the semi-circles, and when more than one web is to be knit on the same machine, the slur knobs and carrier needles must be increased, so that there shall be one slur knob and one carrier needle to every web, of which all of each kind may be attached to one slide.

The semicircles, as some may deem preferable may be placed horizontally upon stands fixed upon the upper rear girth as shown in Figs. 12 and 13,—their axes being upright, and in such case the chains $l$ are attached directly to the bar W, without the use of the guide pulleys $m$, as shown in Fig. 13.

The downward motion of the presser is caused by the action of the cam 8 upon a knob Y fixed upon the crooked iron bar $x$. The crooked iron bar $x$, is hinged at its rear end upon a stud $y$, fixed to the rear girth F and at its front end is attached by a pivot joint at $z$ to the lower end of the rods $w$. The rods $w$, are at their upper ends attached by a pivot joint to the curved brass levers $v$, which are fixed firmly upon the shaft $s$, resting on its axis on the brass stands upon the upper cross bars of the frame E. The presser $r$ is fixed to the shaft $s$, by curved bars or presser bows $t$. When the cam 8 revolves, it presses upon the knob Y, forcing the bars $x$, the rods $w$, and the curved brass levers $v$, downward causing the shaft $s$, to turn and bring the presser $r$ down against the needle beards at $b$. The upward motion of the presser is caused by the spiral springs 12 attached at one end to projections downward from the front girth F, and at the other end to levers 31, projecting from the crooked iron bar $x$ downward at right angles thereto. When the cams 8 allow, the springs 12 draw the lower end of levers 31, forward, and thereby raise the forward end of the bars $x$, with the rods $w$, and curved brass levers $v$, causing the shaft $s$ to turn back and lift the presser after it has performed its office. The presser is thus brought down and elevated, so as to be removed from before the work, and out of the way of the operative.

When ribbed work is to be manufactured, the ribbed-work attachment, Figs. 10 and 11, and represented in Figs. 1, 2 and 3 by red lines is prefixed to the machine by bolting the stands 13 on the front girth F, at 14. The leads 15, Figs. 1, 10, and 11, in which the needles are cast, are secured to the ribbed needle bar 16 in the same manner as in the ribbed stocking loom in common use by screws. The ribbed needle bar 16 is supported by the uprights of the frame 17 usually called the ribbed machine arms, on which it oscillates on pivots at each end. The horns 32 attached at each end of the ribbed needle bar 16, and capable of sliding in apertures in plates 33 attached to the sinker bar 27 of the sinker frame, serve to guide and steady the motions of the ribbed needle bar 16. The upper ends of the uprights of the frame 17, incline against, and slide upon the facing bar 25 as in the ribbed stocking frame in common use, by which they with the plate 16, are forced outward, and a little upward by the forward motion of the sinker frame hereinbefore described. The lower ends of the uprights of the frame 17 are supported upon pivots 20, fixed in the front ends of the curved levers 18 on which pivots they move as upon joints. The curved bars 18 capable of vibrating on the rod 19 depress the frame 17, when the cam 9 raises the back ends of the levers, by striking the rollers attached thereto, and thereby draw down the needles after they have taken the loops. The frame is drawn upward by two spiral springs 26 attached to the curved bars 18 toward their back ends, behind their center of motion, their lower ends being attached to projections inward from the lower girth F.

Operation: The yarn is taken from the wooving bobbins 35 Fig. 1, and passes through the tube of the carrier needle at 36 and is carried by it under the outer lips or ribs of the sinkers. The slur knob following a little behind the carrier needle forces down the jack sinkers as before described carrying down the thread between every other needle. The springs $c$ then draw down the sinker frame, as the cam 6 allows, thereby bringing down the lead sinkers, and completing the looping. The cam 7 then forces all the sinkers forward carrying the loops under the beards of the needles to their points. The cam 6 then lifts the sinker frame so as to lift the inner lips of the sinkers above the needles, while the cam 8 forces down the presser upon the beards of the needles, meanwhile the cam 7 forces the sinker frame, and all the sinkers forward, casting the web over the ends of the needles, and drawing the new loops through the last loops of the web. The springs $c$ then draw down the sinker frame, so that the inner lips or ribs of the sinkers lay hold of the web, thereupon the springs $e$ draw back the sinker frame with the sinkers, carrying the web to its first position. At the same time the cam 6 lifts the sinker frame so that the thread may be allowed to pass under the outer lips or ribs of the sinkers, and the machine is ready to perform another operation.

When ribbed work is to be knit, the movements of the machine are as above described for plain knitting, with the additional movements that after the thread has been forced down by the sinkers between the horizontal needles in the needle bar first described the springs 26 acting upon the curved levers 18 lift the ribbed needle plate 16 while the sinker frame forces it forwerd and a little upward, so that the beards of the needles lay hold of the loops to form the ribbed stitch:—The cams 9 acting on the rear ends of the curved levers 18 draw the ribbed needles, down, and the web being fixed on the horizontal frame needles, the loops are thereby drawn up under their beards. The presser $r$ which is the one above described, and which serves to depress the beards of both sets of needles at the same time is then brought down upon their beards. The facing bar against which the frame 17 rests having forced forward the ribbed needle bar, holds it firmly while the presser acts upon the needles. The cam 9, then lifts the rear ends of the levers 18, and thereby draws down the ribbed work needles, with the new loops, while the former stitches thereon, are drawn over their ends.

In the ribbed work attachment, as above described, a machine slide is dispensed with, the presser $r$ remaining upon the beards of the needles, until the old stitch is drawn above the point of the beards, but as some may prefer to use the machine slide, although the other method is far preferable, the following is the manner in which I construct in my improved machine, the ribbed work attachment with the machine slide, and the operation of the same.

Fig. 37.—is a front view of the ribbed-work attachment with the machine slide, the needles being about one-fourth original size.

Fig. 38.—is an end view of the same.

Fig. 39.—is the form of the two cams which move the machine slide.

41 is the form of the two cams which contribute to move and regulate the motion of the whole ribbed work attachment as constructed with the machine slide, except the motion of the slide and apparatus thereto attached.

The machine slide is a narrow plate of brass nearly the length of the attachment, having its edge bent to an angle of about forty-five degrees as shown in cross section Fig. 38 at 42 and is riveted to the edge of a thin plate of steel 43, the projecting or inclined edge of the brass plate is perforated with small oblong holes through which the ribbed work needles pass.

The size of the apertures in the original machine is about one-eighth of an inch wide, and one-fourth of an inch long; the size of the holes must vary however according to the gage of the loom, or the size of the needles they are to admit,—the length of the holes will also depend upon the inclination of the bent edge of the plate. In its operation when the machine slide is moved up, which takes place immediately after the presser $r$ rises, the upper side of the plate or ends of the apertures press the needle beards into the eyes of the needles, and the lower side brings up the previously formed stitch which is caused to slide off the ends of the needles. The machine slide also acts as a guide for the needles which from their slenderness are liable to deflection. To elevate the machine slide the upper ends of the bars 44, are attached to the ends of the slide and the other ends are connected with the curved levers 45 by the rod 46. The levers 45 vibrate on the pins 19 when the cam 39 which is fixed on the main shaft at 48 is caused to revolve. A bolt fastened by a screw in the slot 49 of the cam 39 acts upon a knob projecting from the back or inner ends of the levers 45 as shown at 50 Fig. 38, and pushes it down at the same time elevating the opposite end upon which the machine slide rests. The slide is depressed by its own weight.

The construction of the other parts of the ribbed work attachment with the machine slide is the same as hereinbefore described, except the cam 41, which is substituted for the cam 9, the rod 20 substituted for the pivots 20 in Figs. 10, and 11, and the pins 19 which are substituted for the rod 19 in Figs. 10 and 11. The falling bar 23 upon which the jacks fall is capable of being raised or lowered by screws, and the stitch gaged by it, and by varying the height of the swells of the cams so that the distance to which the sinkers will be moved up and down, forward and backward will be increased or diminished.

The two small swells on the higher part of cam 7 serve to give two motions or beats forward of the sinkers, which is desirable for weaving heavy work. For weaving very heavy work said cam 7 may be formed with three small swells, and for weaving light work with one swell only, instead of said two small swells.

The slay which separates and guides the jacks is the same as in the common stocking frame now in use.

The downward motion of the sinker frame instead of by the springs $c$ may be produced by weights suspended from the lower ends of the slides M, or by making the frame sufficiently heavy to descend of its own weight. The office of the springs $e$ may be performed by spiral or other steel springs attached to the rear uprights of the iron frame F, which springs may be made to push forward the lower ends of the hanging bars S. The office of the springs 12 also may be performed by spiral springs attached to the forward part of the crooked bar $x$ and to the upper part of the frame, or by a lever and weight.

The office of the springs 26 may be performed by spiral springs attached to the forward part of the curved levers 18, and to the upper part of the frame, or by a lever and weight—or the springs c, e, 12 and 26 may be dispensed with, and the cams 6, 7, 8, 9 and 41 formed with grooves in which knobs attached to projections from the levers or bars moved by said cams may be made to travel.

The office of the semicircles may be performed by a wheel upon which chains may be made to act, as upon the semicircles, but the manner in which I have constructed my machine as above described I deem preferable.

Having thus described the construction and operation of my Improved Machine, I claim as my invention the following new improvements—

1. My first improvement consists in the manner of producing the upward and downward motion as above described of the lead sinkers, and the jack sinkers so far as they move simultaneously, and 2. I claim the half jack U, vibrating on the comb bar P, and connected with the sinker frame, and with the movable cross bar 28 and springs 29 for the purpose of depressing the tail ends of the jacks, and thereby raising their forward ends with the jack sinkers as aforesaid.

3. I also claim the movable cross-bar 28, containing the springs 29, connected as aforesaid, and for the purposes aforesaid.

4. My second improvement consists in the manner of producing the backward and forward motion of the jack and lead sinkers as above described, and 5. I claim the cams 7, in combination with the cross bar 60, with the projections thereon; the hanging bars S, vibrating on pivots, the comb bar P, and the half jacks U connected with the sinker frame as aforesaid and for the purposes aforesaid.

6. My third improvement consists in the manner of moving the carrier needle and slur knob as aforesaid, and 7. I claim the combination of the cam V, and the shoe and shoe plate for the purposes aforesaid.

8. I also claim the combination of the cam V, with the shoe 5, the movable shoe plate $f$, the chains $h$, and $l$, the semicircles and hubs, or wheel and hub, the bar W, connected with the slur carriage, and the slur knob Q, and the horizontal bar X, the carriage $q$, connected with the carrier needle $q^2$, for the purposes aforesaid.

9. My fourth improvement consists in the manner of moving the ribbed work attachment, and producing the ribbed stitch, simultaneously with the plain stitch without the machine slide, and with one presser as above described, and 10. I claim the combination of the cams 9 with the levers 18, connected with the frame 17, and with the ribbed needle bar 16 for the purposes aforesaid—also the same in combination with the presser $r$, connected, moved and operating as aforesaid, and for the purposes aforesaid.

In witness whereof, I have hereto subscribed my hand, and affixed my seal, in the presence of two witnesses this sixteenth day of September in the year eighteen hundred and forty-eight.

JOHN PEPPER. [L. S.]

In Presence of—
ALBERT F. HATCH,
JAMES W. EMERY.